(12) United States Patent
Imaizumi et al.

(10) Patent No.: US 12,071,227 B2
(45) Date of Patent: Aug. 27, 2024

(54) MULTICOPTER

(71) Applicant: NIDEC CORPORATION, Kyoto (JP)

(72) Inventors: Norihisa Imaizumi, Kyoto (JP); Hiroshi Ito, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 1466 days.

(21) Appl. No.: 16/022,711

(22) Filed: Jun. 29, 2018

(65) Prior Publication Data
US 2019/0016449 A1 Jan. 17, 2019

Related U.S. Application Data

(63) Continuation of application No. PCT/JP2016/087520, filed on Dec. 16, 2016.
(Continued)

(51) Int. Cl.
*B64C 27/08* (2023.01)
*A63H 27/00* (2006.01)
(Continued)

(52) U.S. Cl.
CPC ............. *B64C 27/08* (2013.01); *A63H 27/12* (2013.01); *A63H 30/04* (2013.01); *B64C 39/024* (2013.01); *B64D 27/24* (2013.01); *H02K 1/146* (2013.01); *H02K 1/2791* (2022.01); *H02K 11/21* (2016.01); *H02K 11/215* (2016.01); *H02K 11/25* (2016.01); *H02K 11/27* (2016.01); *H02K 21/22* (2013.01); *B64U 10/10* (2023.01); *B64U 10/13* (2023.01); *B64U 30/20* (2023.01); *B64U 50/19* (2023.01); *B64U 2201/20* (2023.01)

(58) Field of Classification Search
CPC ................................. B64C 13/20; B64D 31/10
See application file for complete search history.

(56) References Cited

U.S. PATENT DOCUMENTS

| 4,779,031 A | * | 10/1988 | Arends | H02K 11/25 |
| | | | | 318/434 |
| 6,864,616 B2 | * | 3/2005 | Hollenbeck | H02K 7/14 |
| | | | | 310/43 |

(Continued)

FOREIGN PATENT DOCUMENTS

| GB | 2440251 A | * | 1/2008 | ........... H02K 1/2786 |
| JP | H06255594 | | 9/1994 | |

(Continued)

OTHER PUBLICATIONS

Norihisa Imaizumi, et al., "Motor and Propulsion Device", U.S. Appl. No. 16/022,712, filed Jun. 29, 2018.
(Continued)

*Primary Examiner* — Richard Green
(74) *Attorney, Agent, or Firm* — JCIPRNET

(57) ABSTRACT

As one aspect of this multicopter, the multicopter flies on the basis of information from a flight controller and is provided with the following: a main body section; a plurality of propulsion units having rotating rotary wing, the propulsion units being attached to the main body section; motors installed in the main body section or the propulsion units; at least one first detection unit that detects motor information; and a wireless transmission unit that wirelessly transmits, to the outside, the motor information detected by the first detection unit.

12 Claims, 6 Drawing Sheets

Related U.S. Application Data

(60) Provisional application No. 62/273,544, filed on Dec. 31, 2015.

(51) Int. Cl.

| | |
|---|---|
| *A63H 30/04* | (2006.01) |
| *B64C 39/02* | (2023.01) |
| *B64D 27/24* | (2006.01) |
| *B64U 10/10* | (2023.01) |
| *B64U 30/20* | (2023.01) |
| *B64U 50/19* | (2023.01) |
| *H02K 1/14* | (2006.01) |
| *H02K 1/2791* | (2022.01) |
| *H02K 11/21* | (2016.01) |
| *H02K 11/215* | (2016.01) |
| *H02K 11/25* | (2016.01) |
| *H02K 11/27* | (2016.01) |
| *H02K 21/22* | (2006.01) |
| *B64U 10/13* | (2023.01) |

(56) References Cited

U.S. PATENT DOCUMENTS

| | | | |
|---|---|---|---|
| 6,891,299 B2* | 5/2005 | Coupart | H02K 5/04 |
| | | | 310/156.43 |
| 7,122,923 B2 | 10/2006 | Lafontaine et al. | |
| 7,768,166 B2 | 8/2010 | Lafontaine et al. | |
| 8,167,234 B1 | 5/2012 | Moore | |
| 8,207,642 B2 | 6/2012 | Lafontaine et al. | |
| 9,670,917 B2 | 6/2017 | Nakajima et al. | |
| 9,856,016 B2* | 1/2018 | Mueller | B64D 45/00 |
| 10,039,114 B2* | 7/2018 | Tan | H04W 72/08 |
| 10,491,060 B2* | 11/2019 | Wang | H02K 21/22 |
| 2005/0121989 A1 | 6/2005 | Suzuki | |
| 2012/0262021 A1 | 10/2012 | Lafontaine et al. | |
| 2014/0028125 A1* | 1/2014 | Arai | H02K 3/50 |
| | | | 310/71 |
| 2014/0056726 A1 | 2/2014 | Garrard et al. | |
| 2015/0015101 A1 | 1/2015 | Murakami et al. | |
| 2015/0155760 A1 | 6/2015 | Bessho et al. | |
| 2015/0295477 A1 | 10/2015 | Koizumi et al. | |
| 2016/0156253 A1 | 6/2016 | Owen | |
| 2016/0196525 A1 | 7/2016 | Kantor et al. | |
| 2016/0344261 A1* | 11/2016 | Yen | B60K 7/0007 |
| 2017/0144771 A1 | 5/2017 | Lukaczyk et al. | |
| 2017/0154618 A1 | 6/2017 | Beckman et al. | |

FOREIGN PATENT DOCUMENTS

| | | |
|---|---|---|
| JP | 2005192384 | 7/2005 |
| JP | 2006001487 | 1/2006 |
| JP | 2006082775 | 3/2006 |
| JP | 2006087205 | 3/2006 |
| JP | 2007524335 | 8/2007 |
| JP | 2011-251678 | 12/2011 |
| JP | 2013255374 | 12/2013 |
| WO | 2014198641 | 12/2014 |
| WO | 2014198642 | 12/2014 |

OTHER PUBLICATIONS

"International Search Report (Form PCT/ISA/210)" of PCT/JP2016/087520, dated Jan. 24, 2017, with English translation thereof, pp. 1-4.

Chen Zhum-Ing, "Thematic Design and Production of Electronic Systems", University of Electronic Science and Technology Press, Apr. 2011, submit with English translation, pp. 1-11.

* cited by examiner

MULTICOPTER

CROSS-REFERENCE TO RELATED APPLICATION

This application is a Continuation of PCT International Application No. PCT/JP2016/087520 filed on Dec. 16, 2016, which claims priority under 35 U.S.C § 119(a) to U.S. application No. 62/273,544 filed on Dec. 31, 2015. The above application is hereby expressly incorporated by reference, in its entirety, into the present application.

TECHNICAL FIELD

The disclosure relates to a multicopter.

BACKGROUND ART

An arbitrary helicopter structure including a plurality of motors, particularly, a rotorcraft in which three or more rotors are mounted and which is called a multicopter, has a structure in which independent motors are disposed.

An example of a general multicopter is an AR DRONE (registered trademark) which is provided by Parrot SA. In such a multicopter, for example, a rotary wing is constituted by a propulsion unit including a motor and a propeller which is driven by the motor. The motor of each propulsion unit is controlled by a controller. The controller is driven, for example, by a single central controller which is common to all the propulsion units depending on flight parameters.

For example, Japanese Laid-open No. 2011-251678 discloses a synchronization control method for a plurality of electric motors of which each is controlled by a microcontroller and in which a set of microcontrollers are driven by a central controller.

Patent Literature 1

Japanese Laid-open No. 2011-251678

Control of a motor in the above-mentioned multicopter is performed by a flight controller according to a flying state of the multicopter. However, the flying state of the multicopter may not be maintained in a desired flying state, for example, due to deterioration in performance of the motors.

SUMMARY OF INVENTION

According to an aspect of the disclosure, there is provided a multicopter that flies on the basis of information from a flight controller, the multicopter including: a main body section; a plurality of propulsion units that include a rotating rotary wing and are attached to the main body section; a motor that is mounted in the main body section or the propulsion unit; at least one first detection unit that detects information of the motor; and a wireless transmission unit that wirelessly transmits the information of the motor detected by the first detection unit to the outside.

DESCRIPTION OF EMBODIMENTS

An aspect of the disclosure provides a multicopter in which information of a motor when the multicopter flies can be acquired.

According to an aspect of the disclosure, it is possible to provide a multicopter in which information of a motor when the multicopter flies can be acquired.

Hereinafter, an exemplary embodiment of the disclosure will be described with reference to the accompanying drawings. In this specification, a direction which is parallel to a rotation axis J of a shaft portion 21 of a motor 11 is referred to as an "axial direction," a direction which is perpendicular to the rotation axis J is referred to as a "radial direction," and a direction along an arc centered on the rotation axis J is referred to as a "circumferential direction." In this specification, shapes or positional relationships between portions will be described with the axial direction defined as a vertical direction and with a stator portion 30 side of a base portion 40 as an upper side. That is, a direction in which the rotation axis J extends is defined as the vertical direction. This definition of the vertical direction is not intended to limit directions when a motor according to the disclosure is used.

In this specification, a "parallel direction" includes a substantially parallel direction. In this specification, a "perpendicular direction" includes a substantially perpendicular direction.

Figure 1:
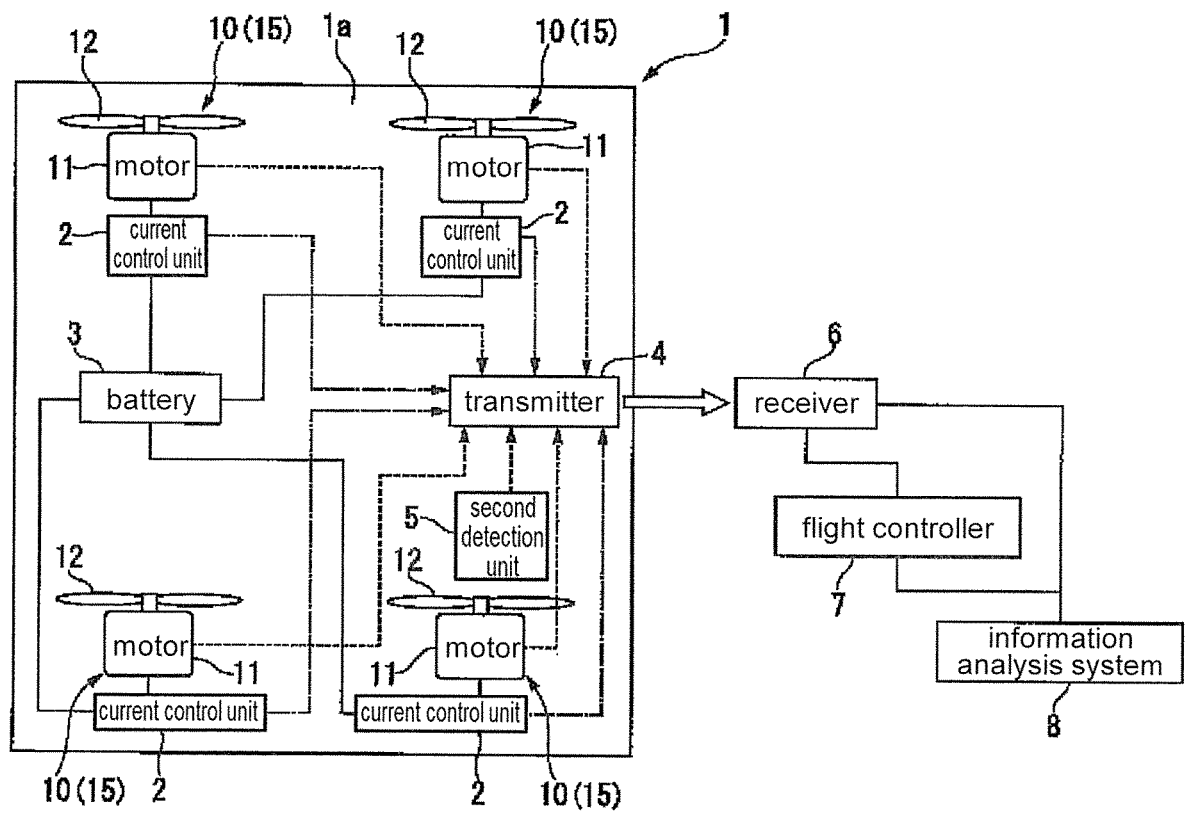
FIG. 1 is a diagram schematically illustrating a configuration of a multicopter according to an embodiment.

A multicopter 1 according to an embodiment illustrated in FIG. 1 flies on the basis of information from a flight controller 7. The multicopter 1 includes a main body section 1a, a battery 3, a current control unit 2, a plurality of propulsion units 10, a second detection unit 5, and a transmitter 4. In this embodiment, the multicopter 1 includes four propulsion units 10 which are arranged in the same plane.

The propulsion units 10 are attached to the main body section 1a. Each propulsion unit 10 includes a rotary wing 12 that rotates and a motor 11 that rotates the rotary wing 12. The propulsion unit 10 generates a propulsive force for the multicopter 1 by rotating the rotary wing 12 using the motor 11. Accordingly, the multicopter 1 can fly in the sky. In this embodiment, a propulsion device 15 for a multicopter includes four propulsion units 10. Since each propulsion unit 10 includes the motor 11, a plurality of motors 11 are provided in the propulsion device 15.

Each propulsion unit 10 includes a power cable and a sensor cable. In FIG. 1, a power cable is indicated by a solid line and a sensor cable is indicated by a dotted line. The power cable connects the battery 3 mounted in the multicopter 1 to the motor 11 via the current control unit 2. In this embodiment, the current control unit 2 is, for example, an electronic speed controller (ESC). The current control unit 2 is provided in each propulsion unit 10.

The sensor cable connects the motor 11 to the transmitter 4. The sensor cable is electrically connected to a rotation sensor 70 and a first temperature sensor 71 that are provided in the motor 11 and that will be described later. Information detected by the rotation sensor 70 and the first temperature sensor 71 is sent to the transmitter 4 via the sensor cable.

The battery 3 is attached to the main body section 1*a*. The battery 3 supplies a current to the propulsion units 10 via the power cables. The current control unit 2 is electrically connected between the propulsion unit 10 and the battery 3 and controls the current supplied from the battery 3 to the propulsion unit 10. Accordingly, it is possible to stabilize electric power supplied to the motor 11 of the propulsion unit 10 and to stabilize driving of the propulsion unit 10. The current control unit 2 outputs information of the current supplied from the battery 3 to the current control unit 2 to a wireless transmission unit of the transmitter 4 which will be described later. The connection between the current control unit 2 and the transmitter 4 which is indicated by alternate long and short dash lines in FIG. 1 may be wireless or wired.

Figure 2:
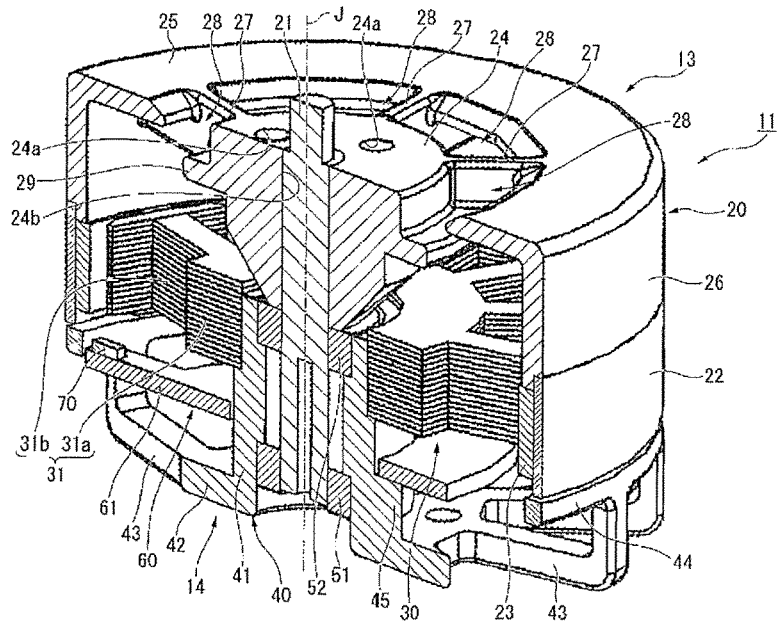
FIG. 2 is a sectional perspective view illustrating a motor according to the embodiment.
Figure 3:
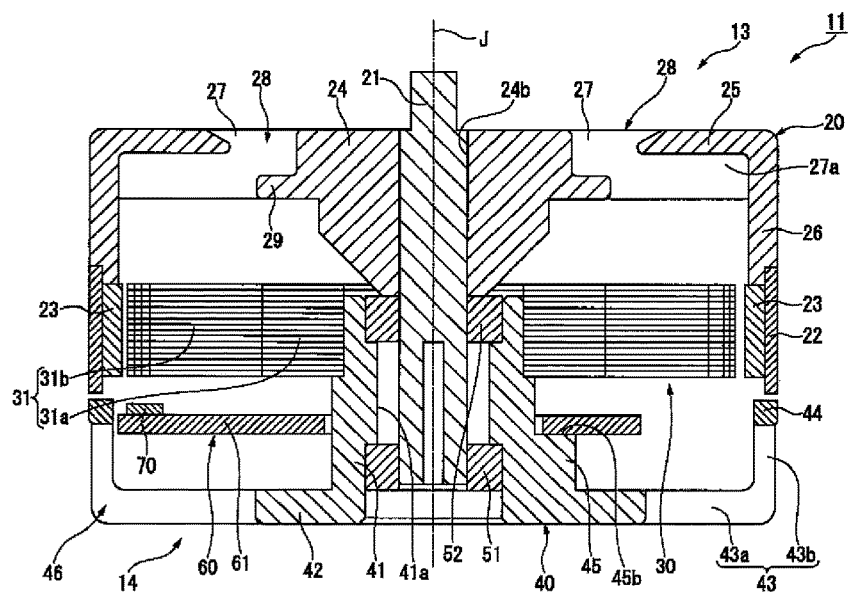
FIG. 3 is a sectional view illustrating the motor according to the embodiment.

As illustrated in FIGS. 2 and 3, the motor 11 according to this embodiment is an outer rotor type motor. The motor 11 includes a rotary section 13 to which the rotary wing 12 is fixed, a stationary section 14 that is attached to the main body section 1*a* of the multicopter 1, and bearing portions 51 and 52 that are connected to the rotary section 13 and the stationary section 14 and rotatably support the rotary section 13. The rotary section 13 is a portion that rotates around a rotation axis J which is substantially perpendicular to a plane in which the plurality of propulsion units 10 are disposed in the circumferential direction in the same plane.

The rotary section 13 includes a shaft portion 21, a rotor portion 20, a magnet 23, and a yoke 22. The shaft portion 21 is a component that extends in the axial direction along the rotation axis J. The shaft portion 21 is rotatably supported by the bearing portions 51 and 52. The bearing portions 51 and 52 are ball bearings including an inner ring, an outer ring, a ball, and a retainer. The bearing portions 51 and 52 may be slide bearings. A lower portion of the shaft portion 21 is inserted into a base penetration hole 41*a* which will be described later and is fixed to the inner rings of the bearing portions 51 and 52.

The rotor portion 20 includes a rotor cylindrical portion 24 that extends in the axial direction along the rotation axis J, a plurality of rotor rib portions 27 that extend outward in the radial direction from the rotor cylindrical portion 24, an edge portion 29 that protrudes outward in the radial direction from an outer circumferential surface of the rotor cylindrical portion 24, an annular rotor flat panel portion 25 that is connected to an outer end of the rotor rib portions 27 and spreads in the circumferential direction, and a substantially cylindrical rotor outer edge portion 26 that extends downward in the axial direction from the rotor flat panel portion 25. The rotor cylindrical portion 24 includes a shaft fixing hole 24*b* that penetrates the rotor cylindrical portion 24 in the axial direction at the center of the rotation axis. An upper portion of the shaft portion 21 is inserted into and fixed to the shaft fixing hole 24*b*. The upper portion of the shaft portion 21 is fixed to the shaft fixing hole 24*b* by adhesion or press fit.

Figure 4:
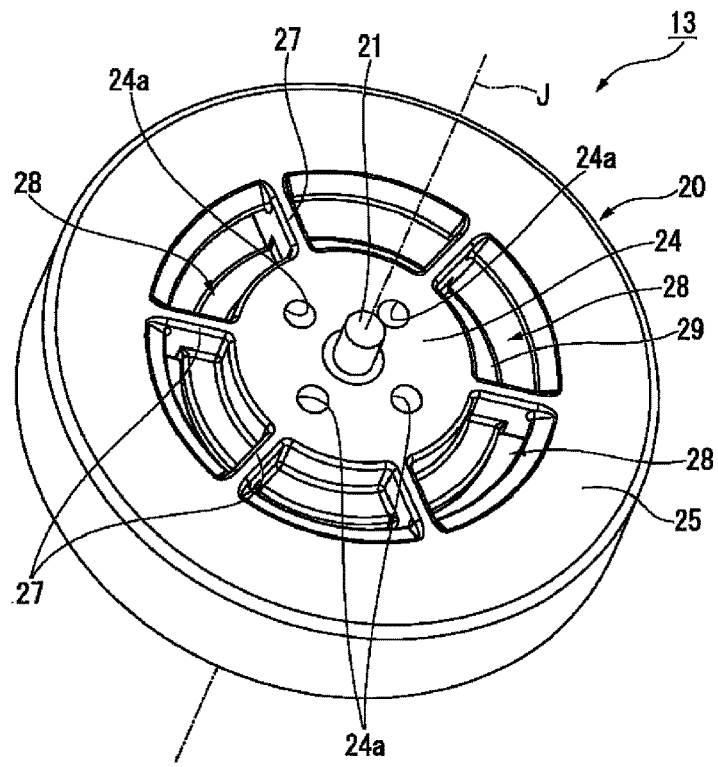
FIG. 4 is a perspective view illustrating a rotor portion according to the embodiment.
Figure 5:
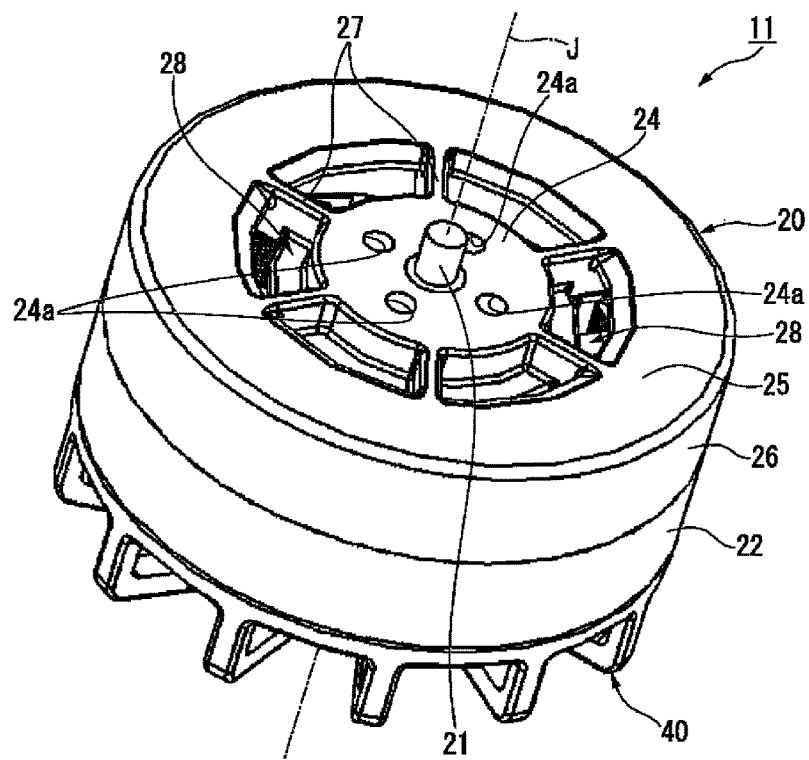
FIG. 5 is a sectional perspective view illustrating the motor according to the embodiment.

The rotor cylindrical portion 24 includes a plurality of rotary wing fixing portions 24*a* to which the rotary wings 12 are fixed. For example, each rotary wing fixing portion 24*a* in this embodiment is a hole portion that penetrates the rotor cylindrical portion 24 in the axial direction. A screw thread is formed on the inner circumferential surface of each rotary wing fixing portion 24*a*. As illustrated in FIGS. 4 and 5, four rotary wing fixing portions 24*a* are provided at equal intervals in the circumferential direction in this embodiment. The rotary wing 12 is fixed to the rotor portion 20 by a screw which is screwed to the rotary wing fixing portion 24*a*. The rotary wing 12 may be fixed to the rotor portion 20 by a method not using a screw such as adhesion or caulking.

Each rotor rib portion 27 extends outward in the radial direction from the upper end of the rotor cylindrical portion 24. The rotor rib portion 27 connects the rotor cylindrical portion 24 to the rotor flat panel portion 25. As illustrated in FIG. 2, the rotor rib portion 27 has a flat panel shape that spreads in the axial direction. That is, the thickness in the axial direction of the rotor rib portion 27 is greater than the thickness in the circumferential direction of the rotor rib portion 27. The rotor rib portion 27 extends to the rotor outer edge portion 26. As illustrated in FIG. 3, the rotor rib portion 27 includes a vane portion 27*a* that is provided on the bottom surface of the rotor flat panel portion 25. The vane portion 27*a* has a flat panel shape that spreads in the axial direction.

As illustrated in FIGS. 4 and 5, a plurality of rotor rib portions 27 are arranged, for example, at equal intervals in the circumferential direction. In this embodiment, for example, six rotor rib portions 27 are provided. As illustrated in FIGS. 2 and 3, the edge portion 29 is located below the rotor flat panel portion 25 in the axial direction. In this embodiment, for example, the edge portion 29 has an annular panel shape. The edge portion 29 overlaps a core back 31*a* which will be described later in the axial direction.

The rotor portion 20 includes rotor hole portions 28 in the circumferential direction of the rotor rib portions 27 by connecting the rotor cylindrical portion 24 and the rotor flat panel portion 25 to the plurality of rotor rib portions 27. Each rotor hole portion 28 is a hole that penetrates the rotor portion 20 in the axial direction. A portion inward in the radial direction of a top opening of the rotor hole portion 28 faces the top surface of the edge portion 29 in the axial direction. Accordingly, at least a part of outside air flowing from the top opening of the rotor hole portion 28 comes in contact with the edge portion 29 and flows outward in the radial direction. As illustrated in FIGS. 4 and 5, for example, six rotor hole portions 28 are provided.

Since the rotor portion 20 includes the rotor hole portions 28, an air circulation path to the inside of the motor 11, that is, to the stator portion 30, is formed and the stator portion 30 can be cooled when the motor 11 is driven. Particularly, in this embodiment, the edge portion 29 overlaps the core back 31*a* in the axial direction. Accordingly, outside air flowing into the top openings of the rotor hole portions 28 is sent outward in the radial direction by the edge portion 29 and is easily blown to coils 32 which will be described later and which are formed of wires wound on teeth 31*b* extending outward in the radial direction from the core back 31*a*. Accordingly, it is possible to efficiently cool the coils 32. That is, since outside air comes in direct contact with the coils 32, it is possible to efficiently cool the wires emitting heat.

In this embodiment, since the rotor rib portion 27 has a flat panel shape that spreads in the axial direction, a flow of air can be formed around the rotor hole portion 28. Accordingly, outside air can be easily made to flow into the motor 11 via the rotor hole portions 28. In this embodiment, since the rotor rib portion 27 includes the vane portion 27*a* provided on the bottom surface of the rotor flat panel portion 25, a flow of air flowing downward in the axial direction can be formed in the motor 11 and the stator portion 30 can be further cooled.

As illustrated in FIGS. 2 and 3, the yoke 22 is a substantially cylindrical member centered on the rotation axis J. The yoke 22 is disposed below the rotor portion 20. More specifically, the yoke 22 is fixed to the bottom end of the rotor outer edge portion 26. The yoke 22 is formed of a ferromagnetic metal. The yoke 22 covers at least a part of the outer circumferential surface of the magnet 23. Accordingly, leakage of a magnetic force from the outer circumferential surface of the magnet 23 is prevented. As a result, it is possible to prevent a torque of the motor 11 from decreasing.

Figure 6:
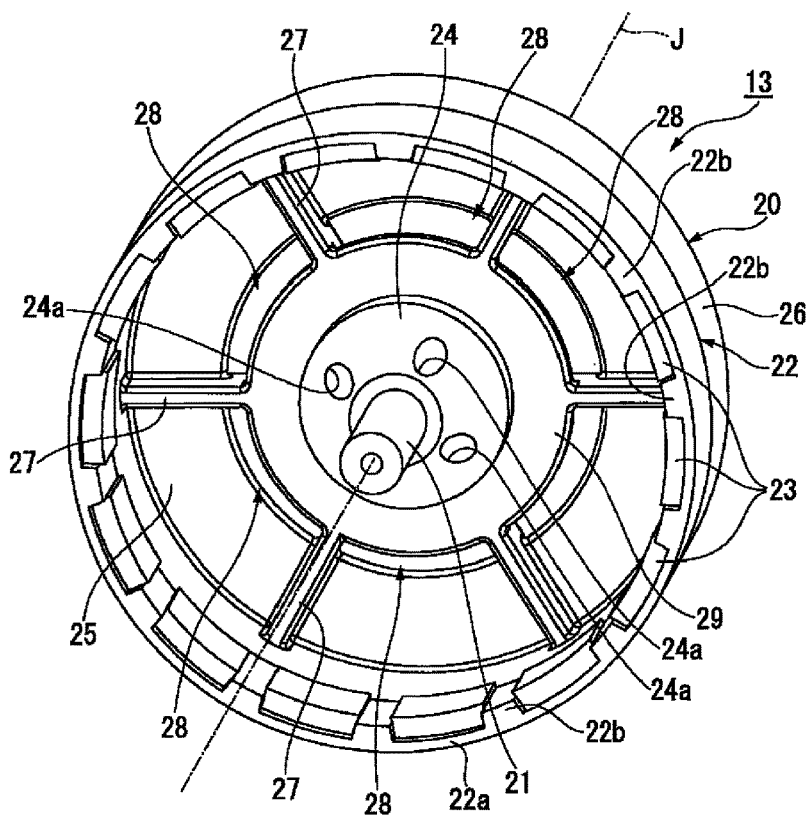
FIG. 6 is a perspective view illustrating a rotary section according to the embodiment.

As illustrated in FIG. 6, for example, the yoke 22 includes an annular yoke cylindrical portion 22a centered on the rotation axis J and a plurality of yoke protruding portions 22b that protrude inward in the radial direction from the inner circumferential surface of the yoke cylindrical portion 22a. The yoke cylindrical portion 22a is disposed outside of the stator portion 30 in the radial direction. The plurality of yoke protruding portions 22b are arranged at substantially equal intervals in the circumferential direction.

The magnet 23 has a substantially arc-like panel shape that extends in the circumferential direction. In this embodiment, a plurality of magnets 23 are provided. In FIG. 6, for example, fourteen magnets 23 are provided. The magnets 23 are fixed to the inner circumferential surface of the yoke 22, for example, by an adhesive. More specifically, a plurality of magnets 23 are fixed to a portion between two neighboring yoke protruding portions 22b in the circumferential direction on the inner surface in the radial direction of the yoke cylindrical portion 22a. Each magnet 23 has an N pole or an S pole on the circumferential surface. Magnets 23 having an N pole and magnets 23 having an S pole are alternately arranged in the circumferential direction.

As illustrated in FIG. 3, the inner circumferential surfaces of the magnets 23 face outer end faces in the radial direction of a plurality of teeth 31b which will be described later with a slight gap therebetween in the radial direction. That is, each magnet 23 includes a magnetic pole face that faces the stator portion 30 in the radial direction. The magnet has a substantially cylindrical shape. In this case, an N pole and an S pole are alternately magnetized in the circumferential direction on the inner circumferential surface of the magnet.

As illustrated in FIGS. 2 and 3, the stationary section 14 includes a base portion 40, a stator portion 30, and a circuit portion 60. The base portion 40 includes a base cylindrical portion 41 that extends in the axial direction along the rotation axis J, a base stepped portion 45 that protrudes outward in the radial direction from the base cylindrical portion 41, a base bottom portion 42 that spreads outward in the radial direction from the base cylindrical portion 41, a plurality of base rib portions 43 that extend outward in the radial direction from the base bottom portion 42, and a base ring portion 44 that is connected to outer ends of the base rib portions 43 in the radial direction and extends in the circumferential direction in an annular shape. The base ring portion 44 is located above the base bottom portion 42 in the axial direction and outside the base bottom portion 42 in the radial direction. A stator core 31 of the stator portion 30 which will be described later is fixed to the outer circumferential surface of the base cylindrical portion 41. More specifically, the outer circumferential surface of the base cylindrical portion 41 and the inner circumferential surface of the stator core 31 are fixed to face each other in the radial direction.

The base cylindrical portion 41 includes a base penetration hole 41a that penetrates the base cylindrical portion 41 in the axial direction along the rotation axis J. The bearing portions 51 and 52 are disposed inside the base penetration hole 41a. The two bearing portions 51 and 52 are arranged in the axial direction inside the base penetration hole 41a. The base penetration hole 41a includes an inner circumferential surface of the base cylindrical portion which is directed inward in the radial direction. The outer circumferential surface of the outer rings of the bearing portions 51 and 52 are fixed to the inner circumferential surface of the base cylindrical portion. The bearing portions 51 and 52 are fixed to the shaft portion 21 and the base portion 40 and thus support the rotary section 13 to be rotatable about the rotation axis J.

Figure 7:
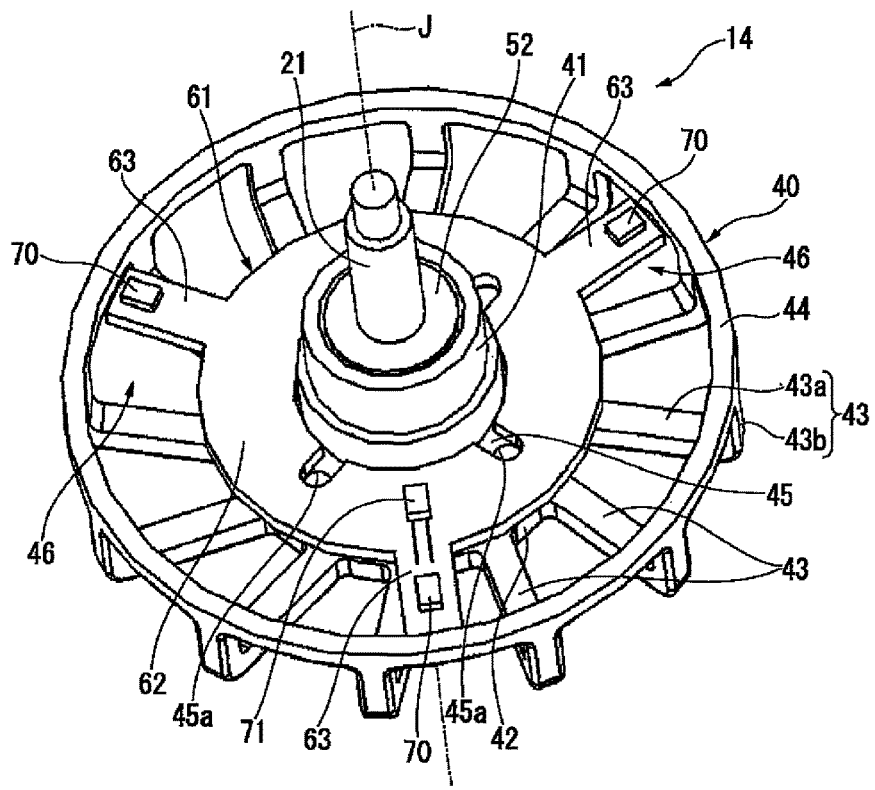
FIG. 7 is a perspective view illustrating a part of a stationary section according to the embodiment.

The base stepped portion 45 includes a stepped portion top surface 45b directed upward in the axial direction. As illustrated in FIG. 7, hole portions 45a that are open upward and extend in the axial direction are provided in the base stepped portion 45. A screw thread is provided in each hole portion 45a. In FIG. 7, the stator portion 30 is not illustrated.

The plurality of base rib portions 43 are arranged at equal intervals in the circumferential direction. In this embodiment, for example, 12 base rib portions 43 are provided. In this embodiment, each base rib portion 43 includes a horizontal rib portion 43a and a vertical rib portion 43b. The horizontal rib portion 43a extends outward in the radial direction from the base bottom portion 42. The vertical rib portion 43b extends upward in the axial direction from an outer end of the horizontal rib portion 43a in the radial direction. The top end of the vertical rib portion 43b is connected to the base ring portion 44.

Figure 8:
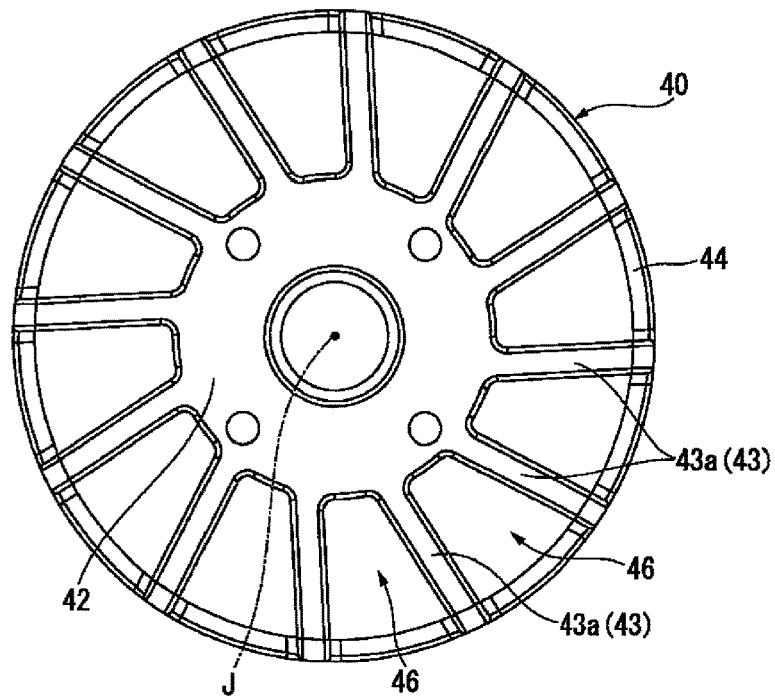
FIG. 8 is a bottom view illustrating the motor according to the embodiment.

As illustrated in FIG. 8, the horizontal rib portion 43a extends in a direction inclined in the circumferential direction with respect to a line extending in the radial direction from the rotation axis J. Specifically, the horizontal rib portion 43a is inclined in the circumferential direction in a range of one degree to ten degrees with respect to the line extending in the radial direction from the rotation axis J. The horizontal rib portion 43a may be inclined in the circumferential direction in a range of five degrees to eight degrees with respect to the line extending in the radial direction from the rotation axis J.

The base portion 40 includes a plurality of base hole portions 46 in the circumferential direction of the base rib portions 43 by connecting the base bottom portion 42 and the base ring portion 44 to the plurality of base rib portions 43. Each base hole portion 46 is a hole that penetrates the base portion 40 in the axial direction.

Since the base portion 40 includes the base hole portions 46, air flows into the motor 11, that is, to the stator portion 30, and the stator portion 30 can be cooled when the motor 11 is driven. In this embodiment, 12 base hole portions 46 are provided, but the number of base hole portions 46 is not limited and may be equal to or greater than 13 or may be equal to or less than 11.

In this embodiment, it is possible to efficiently cool the inside of the motor 11 by combining the rotor hole portions 28 and the base hole portions 46. Outside air can flow into the motor 11 from above the rotor portion 20 via the rotor hole portions 28 to cool the stator portion 30 by rotation of the rotor portion 20 or rotation of the rotary wing 12. By discharging air heated in the motor 11 from the base hole portions 46 to the outside of the motor 11, it is possible to efficiently cool the inside of the motor 11.

Figure 9:
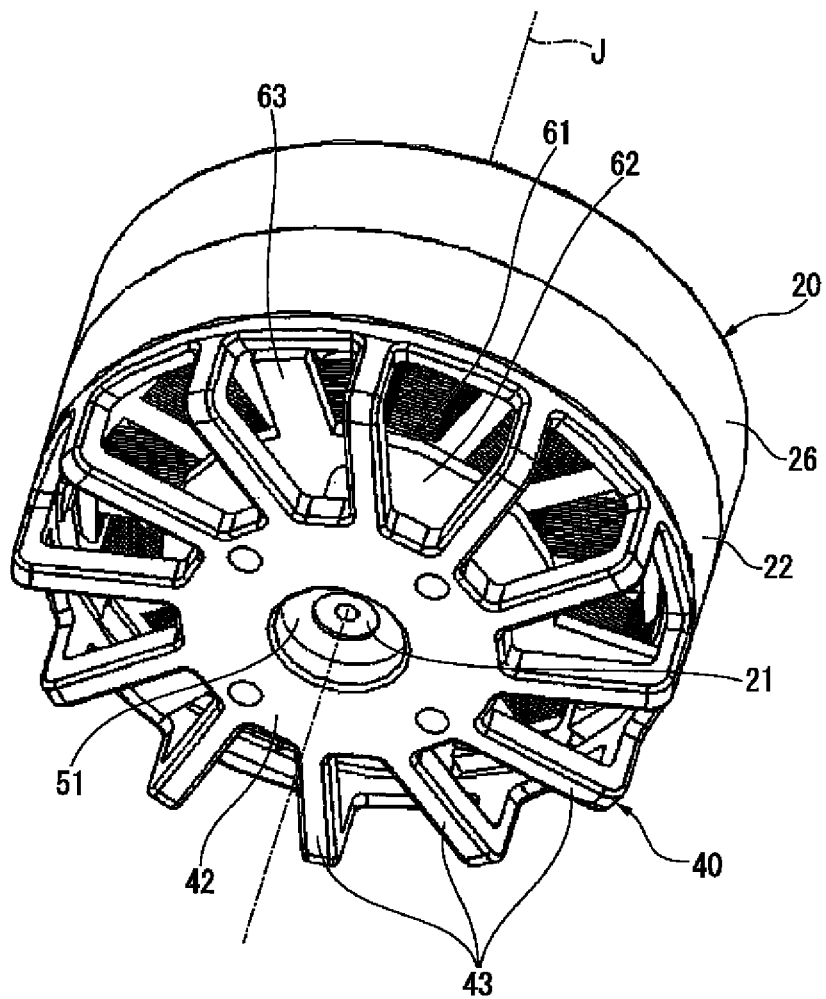
FIG. 9 is a perspective view illustrating the motor according to the embodiment.

In this embodiment, since each base rib portion 43 includes the horizontal rib portion 43a and the vertical rib portion 43*b*, each base hole portion 46 includes a portion that penetrates the base portion 40 in the axial direction and a portion that penetrates the base portion 40 in the radial direction as illustrated in FIG. 9.

For example, when each base hole portion includes only a portion that penetrates the base portion in the axial direction and the bottom surface of the base portion 40 is attached to the multicopter 1 or the propulsion unit 10, there is concern that the base hole portion will be clogged to hinder discharge of air. Accordingly, there is concern that the inside of the motor 11 will not be able to be efficiently cooled. However, by causing the base hole portion 46 to include a portion that penetrates the base portion in the radial direction as in this embodiment, it is possible to discharge air inside the motor 11 in the radial direction even when the bottom side of the base hole portion 46 is clogged. Accordingly, it is possible to efficiently cool the inside of the motor 11.

Figure 10:
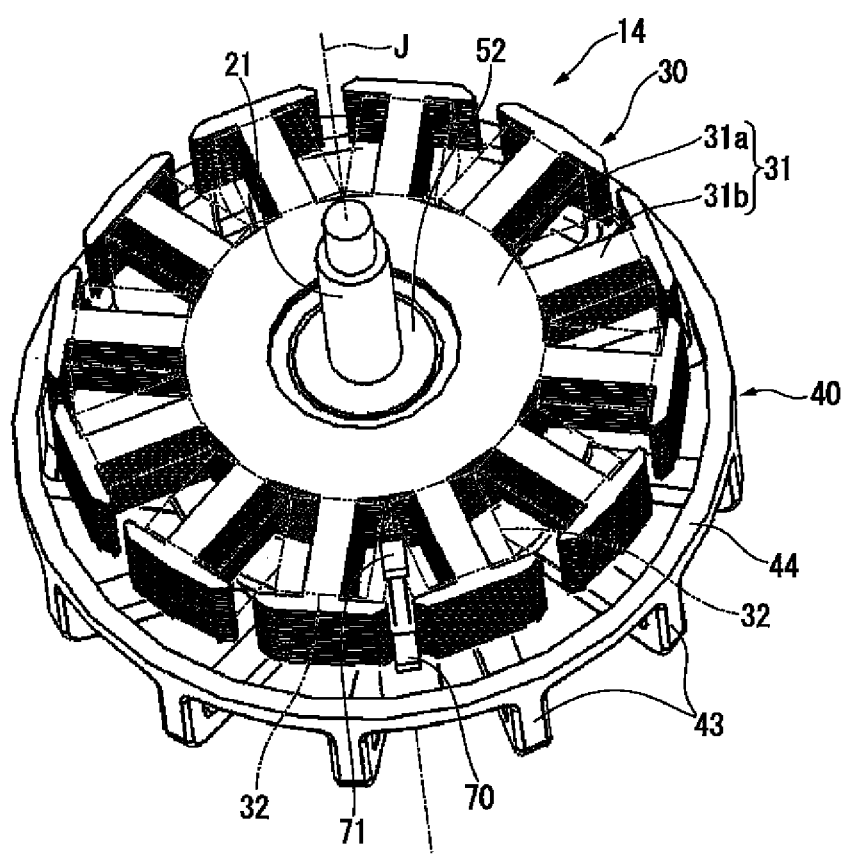
FIG. 10 is a perspective view illustrating the stationary section according to the embodiment.

As illustrated in FIG. 3, the stator portion 30 faces the rotary section 13 with a gap in the radial direction. As illustrated in FIG. 10, the stator portion 30 is an armature including a stator core 31 and a plurality of coils 32 that are supplied with a current. That is, the stationary section 14 includes a plurality of coils 32. In FIGS. 2, 3, and 9, the coils 32 are not illustrated. The stator core 31 is a magnetic member. The stator core 31 in this embodiment is formed of a laminated steel sheet in which electromagnetic steel sheets are stacked in the axial direction. The stator core 31 is fixed to the base portion 40. The stator core 31 includes a core back 31*a* and a plurality of teeth 31*b*. The core back 31*a* has an annular shape centered on the rotation axis J. The plurality of teeth 31*b* extend outward in the radial direction from the core back 31*a*. The plurality of teeth 31*b* are arranged at substantially equal intervals in the circumferential direction. Each coil 32 is formed of a wire which is wound around each of the teeth 31*b*.

Although not illustrated in the drawing, a coil leader line drawn from each coil 32 is connected to the current control unit 2 or the battery 3 via a stator wiring portion drawn to the outside of the motor 11. The coil leader line drawn from the coil 32 may be connected to the circuit portion 60, and a circuit wiring portion drawn from the circuit portion 60 to the outside of the motor 11 may be connected to the current control unit 2 or the battery 3. A driving current is supplied to the coil 32 via the stator wiring portion or the circuit wiring portion.

In the motor 11, when a driving current is supplied to the coils 32, magnetic flux is generated in the plurality of teeth 31*b*. A torque in the circumferential direction is generated between the stationary section 14 and the rotary section 13 by an action of the magnetic flux between the teeth 31*b* and the magnets 23. As a result, the rotary section 13 rotates around the rotation axis J with respect to the stationary section 14. The rotary wing 12 supported by the rotary section 13 rotates around the rotation axis J along with the rotary section 13.

As illustrated in FIG. 3, the circuit portion 60 is fixed to at least a part of the base portion 40. The circuit portion 60 includes a circuit board 61 having a flat panel shape and at least one first detection unit that detects information of the motor 11. That is, the stationary section 14 includes the circuit board 61. The motor 11 includes the first detection unit. In this embodiment, the first detection unit includes the rotation sensor 70 and the first temperature sensor 71. In this embodiment, a plurality of motors 11 include the same first detection unit. Accordingly, since the same motor can be used as the motor 11 of each propulsion unit 10, it is possible to easily manufacture the propulsion device 15.

The circuit board 61 is disposed on one side in the axial direction of the stator portion 30, that is, on the lower side thereof. The circuit board 61 is installed on a stepped portion top surface 45*b*. The circuit board 61 is fixed to the base stepped portion 45 by a screw which is fastened to the hole portion 45*a*. Accordingly, the circuit portion 60 is connected to the base portion 40. The circuit board 61 may be fixed to the base portion 40 by a method not using a screw such as adhesion. In this embodiment, the circuit board 61 is disposed between the stator portion 30 and the base bottom portion 42 in the axial direction. The circuit board 61 is disposed at a position lower than the top end of the base ring portion 44. Although not illustrated in the drawing, a sensor cable as an output unit is attached to one side in the axial direction of the circuit board 61, that is, on a lower surface thereof.

As illustrated in FIG. 7, the circuit board 61 includes a substantially annular board flat panel portion 62 that is located on the outside of the base cylindrical portion 41 in the radial direction and a plurality of board protruding portions 63 that extend outward in the radial direction from the board flat panel portion 62. The board protruding portions 63 are disposed at positions overlapping the base hole portions 46 in the axial direction. In this embodiment, for example, three board protruding portion 63 are provided. The three board protruding portions 63 are arranged at equal intervals over one circumstance in the circumferential direction.

In this embodiment, the rotation sensor 70 is a Hall device. The rotation sensor 70 detects circumferential position information of the rotary section 13. That is, information of the motor 11 detected by the first detection unit in this embodiment includes circumferential position information of the rotary section 13. Accordingly, the number of revolutions or a rotation speed of the rotary section 13 can be detected by the rotation sensor 70. The rotation sensor 70 is disposed on the top surface of the circuit board 61. That is, the at least one first detection unit is attached to the other side in the axial direction of the circuit board 61, that is, the top surface thereof.

In this embodiment, for example, three rotation sensors 70 are provided. The three rotation sensors 70 are arranged in outer end portions in the radial direction of the top surfaces of the board protruding portions 63. As illustrated in FIG. 3, the rotation sensors 70 face the outer end portions in the radial direction of the teeth 31*b* with a gap in the axial direction. The rotation sensor 70 detects circumferential position information of the rotary section 13 by detecting change of magnetic flux of the magnets 23. Here, the circumferential position information of the rotary section 13 detected by the rotation sensor 70 can be information on a circumferential position of the rotary section 13. For example, the circumferential position information may be information indicating a position in one turn of the rotary section 13 with respect to a certain reference position or may be information indicating a range in one turn of the rotary section 13. For example, the circumferential position information may be information indicating a relative positional relationship between the magnets 23 and the rotation sensors 70 or may be the number of times the magnet 23 in the rotary section 13 passes through above the rotation sensor 70.

In this embodiment, a Hall device that detects change of the magnetic flux of the magnet 23 is used as the rotation sensor 70 that detects the circumferential position information of the rotary section 13, but the disclosure is not limited thereto. The rotation sensor may be an optical photo sensor that detects the circumferential position information of the rotary section 13 by irradiating the rotary section 13 with light or may be another type sensor.

A signal detected by the rotation sensor 70 is transferred to the transmitter 4 via a conductive pattern disposed in the circuit board 61 and the sensor cable connected to the circuit board 61. That is, the motor 11 includes the sensor cable as an output unit that outputs information of the motor 11 detected by the rotation sensor 70 to the outside. Accordingly, according to this embodiment, it is possible to output information of the motor 11 when the multicopter 1 flies to the outside of the motor 11 via the sensor cable. Accordingly, it is possible to acquire the information of the motor 11 when the multicopter 1 flies by transmitting the output information of the motor 11 to a receiver 6 installed on the ground using the transmitter 4 or the like. As a result, it is possible to maintain a flying state of the multicopter 1 in a desired flying state by controlling the multicopter 1 on the basis of the acquired information of the motor 11.

Since the information of the motor 11 when the multicopter 1 flies can be acquired, it is possible to optimize design specifications of the motor 11 depending on the multicopter 1. Accordingly, it is possible to manufacture the motor 11 which is suitable for the multicopter 1. As a result, it is possible to improve flight performance of the multicopter 1.

According to this embodiment, the motor 11 is a motor that is mounted in the propulsion unit 10 and rotates the rotary wing 12. Accordingly, it is possible to easily understand the state of the propulsion unit 10 by acquiring the information of the motor 11.

The number of rotation sensors 70 may be equal to or less than two. It is possible to more accurately detect a rotational state of the rotary section 13 by providing a plurality of rotation sensors 70. By providing a plurality of rotation sensors 70, even when one rotation sensor 70 malfunctions, it is possible to detect the rotational state of the rotary section 13 using another rotation sensor 70.

In this embodiment, by disposing the rotation sensor 70 in the board protruding portion 63, the rotation sensor 70 can be arranged close to the magnet 23 in the radial direction. Accordingly, it is possible to improve detection accuracy of the circumferential position information of the rotary section 13 using the rotation sensor 70. By providing the board protruding portions 63, the dimension in the radial direction of the circuit board 61 can be decreased in an area other than the positions at which the rotation sensors 70 are disposed, that is, in the board flat panel portion 62. Accordingly, it is possible to prevent the top surfaces of the base hole portions 46 from being covered by the circuit board 61 and to efficiently discharge air in the motor 11 to the lower side of the motor 11 via the base hole portions 46. That is, it is possible to prevent air in the motor 11 from being hindered by the circuit board 61.

The first temperature sensor 71 detects the temperature of the motor 11. That is, in this embodiment, the information of the motor 11 detected by the first detection unit includes the temperature of the motor 11. In this embodiment, the first temperature sensor 71 detects the temperature of the motor 11, particularly, the temperature of the coils 32. As illustrated in FIGS. 7 and 10, the first temperature sensor 71 is disposed on the top surface of the circuit board 61. More specifically, the first temperature sensor 71 is disposed on the top surface of one of the board protruding portions 63. The first temperature sensor 71 is disposed inside the rotation sensor 70 in the radial direction.

The first temperature sensor 71 includes a sensor body and two terminals that extend downward from the sensor body. The two terminals are connected to the top surface of the circuit board 61. The sensor body of the first temperature sensor 71 is disposed between the coils 32 adjacent to each other in the circumferential direction. Accordingly, it is possible to appropriately detect the temperature of the coils 32. The sensor body of the first temperature sensor 71 comes in contact with the coils 32 directly or via another member. Accordingly, it is possible to more appropriately detect the temperature of the coils 32. Another member is, for example, a sheet-shaped member having an acrylic thermally conductive layer. By disposing a sheet having thermal conductivity to be in close contact with the sensor body of the first temperature sensor 71 and the coils 32, it is possible to efficiently detect the temperature of the coils 32.

The sensor body of the first temperature sensor 71 may be disposed between the circuit board 61 and the coils 32 in the axial direction. In this case, for example, the sensor body of the first temperature sensor 71 may be in contact with the coils 32 directly or via another member below the coils 32 in the axial direction. Accordingly, it is possible to more appropriately detect the temperature of the coils 32 using the first temperature sensor 71.

By disposing the first temperature sensor 71 below the coils 32 in the axial direction, it is possible to prevent the first temperature sensor 71 from coming in direct contact with air flowing from above to below the stator portion 30. Accordingly, it is possible to decrease a detection error of the temperature of the coils 32 using the first temperature sensor 71 and to more accurately detect the temperature of the coils 32.

As described above, by providing a plurality of types of first detection units for each motor 11, it is possible to acquire a plurality of types of information of the motor 11 and to more accurately understand the state of the motor 11 and the state of the propulsion unit 10.

The second detection unit 5 illustrated in FIG. 1 is mounted in the main body section 1a. The second detection unit 5 detects information of a flying state of the multicopter 1. The information of the flying state of the multicopter 1 includes, for example, a posture of the multicopter 1, a flight speed of the multicopter 1, a height of the multicopter 1, an ambient temperature of the flying multicopter 1, a wind volume flowing around the flying multicopter 1, and vibration generated in the multicopter 1. The information of the flying state of the multicopter 1 detected by the second detection unit 5 is output to the transmitter 4.

The transmitter 4 transmits information indicating the state of the multicopter 1. In this embodiment, the information indicating the state of the multicopter 1 includes the information of the motor 11 and the information of the flying state of the multicopter 1. Information transmitted from the transmitter 4 is transmitted to the flight controller 7 of a pilot of the multicopter 1 or an information analysis system 8 via the receiver 6. The transmitter 4 includes a CPU, a memory, and a wireless transmission unit. That is, the multicopter 1 includes the CPU, the memory, and the wireless transmission unit.

The information of the motor 11 detected by the rotation sensor 70 and the first temperature sensor 71, information of the flying state of the multicopter 1 detected by the second detection unit 5, and information of a current supplied from the battery 3 to the current control unit 2 are input to the CPU via the sensor cables. The CPU processes the input information. Specifically, for example, the CPU calculates the number of revolutions, the rotation speed, or the like of the rotary section 13 from the circumferential position information of the rotary section 13 detected by the rotation sensor 70. The CPU outputs the processed information to the wireless transmission unit. The memory stores the information processed by the CPU. Accordingly, even when communication conditions between the transmitter 4 and the receiver 6 are not good, it is possible to store the information processed by the CPU in the memory and to curb loss of information.

The wireless transmission unit transmits the information of the motor 11 detected by the rotation sensor 70 and the first temperature sensor 71, the information of the flying state of the multicopter 1 detected by the second detection unit 5 and the information of the current supplied from the battery 3 to the current control unit 2 to the outside in a wireless manner. Accordingly, it is possible to obtain a multicopter 1 in which the information of the motor 11 when the multicopter 1 flies can be acquired.

In this embodiment, since the motor 11 includes the first detection unit, it is possible to more accurately detect the information of the motor 11 in comparison with a case in which the first detection unit is provided in the main body section 1a, or the like.

More specifically, the wireless transmission unit transmits the information processed by the CPU to the receiver 6. The information received by the receiver 6 is transmitted to the flight controller 7 to provide information to a pilot of the multicopter 1. That is, the wireless transmission unit transmits information to the flight controller 7. The information received by the receiver 6 is transmitted to a cloud type information analysis system 8 to analyze the flying state of the propulsion unit 10. That is, the wireless transmission unit transmits information to the cloud type information analysis system. Accordingly, by monitoring or analyzing the information of the motor 11, a ground side can monitor a driving state of the propulsion unit 10 mounted in the multicopter 1 flying in the sky. It is also possible to detect or predict an abnormality occurring in the propulsion unit 10.

In this embodiment, the information of the flying state of the multicopter 1 detected by the second detection unit 5 is transmitted to the flight controller 7 and the information analysis system 8. Accordingly, it is possible to acquire more accurate information of the multicopter 1 by analyzing the information of the motor 11 and the information of the flying state of the multicopter 1 in combination.

In this embodiment, the information of the current supplied to the current control unit 2 can be transmitted from the wireless transmission unit to the outside of the motor 11 using the current control unit 2. Accordingly, it is possible to more accurately monitor the driving state of the motor 11.

The wireless transmission unit collects and transmits the information of the motor 11 detected by a plurality of types of first detection units for each propulsion unit 10. Accordingly, it is possible to easily understand the state of each propulsion unit 10. The wireless transmission unit may collect and transmit the information of the motor 11 detected by a plurality of types of first detection units for each type of the first detection units. According to this configuration, it is possible to easily analyze the information.

The disclosure is not limited to the above-mentioned embodiment, and may employ another configuration.

A plurality of first temperature sensors 71 may be provided. For example, three first temperature sensors 71 may be provided in the circuit board 61. In this case, the first temperature sensors 71 may be arranged below the coils 32 of different phases of the stator portion 30 in the axial direction. That is, when the stator portion 30 includes three-phase coils 32, the first temperature sensors 71 are disposed for the three phases. Accordingly, the temperatures of the coils 32 of three phases are detected by the first temperature sensors 71. It is possible to more accurately detect and predict emission of heat from the coils 32 by detecting the temperatures of the coils 32 of three phases. One first temperature sensor 71 may be disposed between the coils 32 adjacent to each other in the circumferential direction and may detect the temperatures of both the adjacent coils 32.

The first detection unit may include a second temperature sensor that detects the temperature of the atmosphere surrounding the motor 11. That is, the information of the motor 11 detected by the first detection unit may include the temperature of the atmosphere surrounding the motor 11. By measuring the temperature of the atmosphere surrounding the motor 11 using the second temperature sensor, it is possible to accurately detect a difference between the temperature of the atmosphere surrounding the motor 11 and the temperature of the coils 32 detected by the first temperature sensor 71 and to more accurately measure an amount of heat emitted from the coils 32. In this way, by detecting the temperature of the coils 32 from the detection results of the first temperature sensor 71 and the second temperature sensor, it is possible to more accurately detect and predict abnormal emission of heat of the stator portion 30 or the motor 11. The second temperature sensor is attached, for example, to the bottom surface of the circuit board 61. By disposing the second temperature sensor on the bottom surface opposite to the top surface facing the coils 32 among the surfaces of the circuit board 61, the second temperature sensor is not easily affected by the heat of the coils 32 and it is possible to more accurately detect the temperature outside the motor 11 using the second temperature sensor.

The first detection unit may include a humidity sensor that a humidity of the atmosphere surrounding the motor 11. That is, the information of the motor 11 detected by the first detection unit may include the humidity of the atmosphere surrounding the motor 11. By measuring the humidity of the atmosphere surrounding the motor 11 using the humidity sensor, it is possible to detect a relationship between the humidity of the surrounding atmosphere and the behavior of the motor 11 and to more accurately predict the behavior of the motor 11.

In this embodiment, since outside air flows into the motor 11 as described above, it is possible to easily detect the temperature and the humidity of the atmosphere surrounding the motor 11 using the second temperature sensor and the humidity sensor.

The first detection unit ma include an acceleration sensor that detects an acceleration of the motor 11. That is, the information of the motor 11 detected by the first detection unit may include the acceleration of the motor 11. By measuring the acceleration of the motor 11 using the acceleration sensor, it is possible to more accurately detect the behavior of the motor 11, the propulsion unit 10 and the multicopter 1. It is possible to more accurately measure the positions of the motor 11, the propulsion unit 10, and the multicopter 1. It is also possible to detect and predict abnormal acceleration of the motor 11, the propulsion unit 10, and the multicopter 1.

For example, the acceleration sensor is provided in the circuit board 61. A plurality of acceleration sensors may be provided. For example, three acceleration sensors may be attached to the circuit board 61, and the acceleration sensors may be disposed at positions which axially face different circumferential positions of the stator portion 30. It is possible to detect more detailed behavior of the motor 11 from the signals detected by the plurality of acceleration sensors. Accordingly, it is possible to more accurately detect and predict abnormal acceleration of the motor 11, the propulsion unit 10, and the multicopter 1.

A sensor having a plurality of detectors built therein may be used as the acceleration sensor. That is, for example, a six-axis acceleration sensor may be provided as the acceleration sensor. Accordingly, in comparison with a case in which a plurality of single-axis acceleration sensors are provided, it is possible to simplify a circuit configuration and to acquire more acceleration information using one acceleration sensor. For example, it is possible to detect the posture of the motor 11 using the acceleration sensor. Particularly, the propulsion unit 10 is likely to be disposed at a position separated from the center of the multicopter 1. By mounting the acceleration sensor in the propulsion unit 10 disposed at such a position, it is possible to appropriately detect the posture of the motor 11.

The first detection unit may include a sonic wave sensor that detects information of sonic wave generated from the motor 11. That is, the information of the motor 11 detected by the first detection unit may include information of sonic waves generated from the motor 11. By measuring the information of sonic waves generated from the motor 11 using the sonic wave sensor, it is possible to detect and predict occurrence of an abnormality in behavior of the motor 11. Specifically, by detecting noise when the rotary section 13 rotates, it is possible to detect occurrence of an abnormality in rotation of the rotary section 13. It is possible to detect a decrease in rotation performance of the rotary section 13 or the like on the basis of change of sound generated when the rotary section 13 rotates. For example, a plurality of sonic wave sensor may be provided. By disposing a plurality of sonic wave sensors at different positions of the motor 11, it is possible to more accurately detect information of sonic waves generated from the motor 11. The sonic wave sensor is provided, for example, in the circuit board 61.

The first detection unit may include a substance sensor that detects information of substances included in the atmosphere surrounding the motor 11. That is, the information of the motor 11 detected by the first detection unit may include information of substances included in the external atmosphere of the motor 11. By detecting the information of substances included in the atmosphere surrounding the motor 11 using the substance sensor, it is possible to detect chemicals around the propulsion unit 10 and the multicopter 1. Accordingly, for example, when agricultural chemicals or the like are sprayed using the multicopter 1, it is possible to measure a concentration of the sprayed agricultural chemicals or the like in the external atmosphere. By detecting the information of substances included in the atmosphere surrounding the motor 11, it is possible to detect and predict an influence of substances included in the external atmosphere to the motor 11. In this embodiment, since outside air flows into the motor 11 as described above, it is possible to easily appropriately detect substances in the atmosphere surrounding the motor 11 using the substance sensor.

The first detection unit may include an inclination sensor that detects an inclination of the motor 11 with respect to the main body section 1*a*. That is, the information of the motor 11 detected by the first detection unit includes an inclination of the motor 11 with respect to the main body section 1*a*. Since the inclination of the motor 11 with respect to the main body section 1*a* can be detected using the inclination sensor, it is possible to detect that the posture of the motor 11 with respect to the main body section 1*a* is abnormal, for example, due to loosening of fixation of the motor 11 to the main body section 1*a*.

The first detection unit may include a current sensor that detects a value of a current flowing in the coils 32. That is, the information of the motor 11 may include a value of a current flowing in the coils 32. By measuring the value of the current flowing in the coils 32 using the current sensor, it is possible to detect a driving state of the motor 11. Since an abnormality of the motor 11 often appears in the current for driving the motor 11, it is possible to more easily detect the abnormality of the motor 11. It is possible to more easily predict the abnormality of the motor 11.

When the information of the motor 11 detected by various sensors as the first detection unit is processed by the CPU, it is possible to more appropriately detect the information of the motor 11 using the CPU by appropriately combining the information.

The sensor cable and the transmitter 4 may be connected in a wireless manner. That is, the output unit may be a wireless output unit that outputs the information of the motor to the outside in a wireless manner. In this case, the wireless output unit is connected to the rotation sensor 70 and the first temperature sensor 71 via a cable. The wireless output unit is attached, for example, to the bottom surface of the circuit board 61. As in the above-mentioned embodiment, when the top surface of the circuit board 61 faces the stator portion 30 in the axial direction, it is possible to prevent heat of the stator portion 30 from being transmitted to the wireless output unit by disposing the wireless output unit on the bottom surface opposite to the surface of the circuit board 61 facing the stator portion 30. Accordingly, it is possible to prevent the wireless output from being damaged by the heat. In this configuration, a reception unit that receives a wireless signal transmitted from the wireless output unit is provided in the transmitter 4. The reception unit is connected to the wireless transmission unit provided in the transmitter 4 via a cable. By employing this configuration, it is possible to decrease the number of lines and the weight of the multicopter 1.

In the above-mentioned embodiment, the top openings of the six rotor hole portions 28 face the top surface of the edge portion 29 in the axial direction, but the disclosure is not limited thereto. For example, the top openings of some rotor hole portions 28 among the rotor hole portions 28 may not face the top surface of the edge portion 29 in the axial direction. That is, the edge portion 29 may not be provided at circumferential positions at which some rotor hole portions 28 are provided. Air passing through the rotor hole portions 28 in which the edge portion 29 is not provided flows into the motor 11 in the axial direction. In this way, by combining the rotor hole portions 28 in which the edge portion 29 is provided and the rotor hole portions 28 in which the edge portion 29 is not provided, it is possible to widely cool a space in the motor 11. The number of rotor hole portions 28 is not particularly limited and may be equal to or greater than seven or may be equal to or less than five.

In the above-mentioned embodiment, the edge portion 29 has a flat panel shape that extends outward in the radial direction from the rotor cylindrical portion 24, but the shape of the edge portion 29 is not limited thereto. For example, instead of the edge portion 29, the rotor cylindrical portion 24 may have a large-diameter portion that spreads outward in the radial direction. That is, the rotor cylindrical portion 24 may include a small-diameter portion that faces the rotor flat panel portion 25 in the radial direction and a large-diameter portion that has a greater outer radius than that of the small-diameter portion below the small-diameter portion. In this case, a stepped surface provided in a diameter-varying portion between a small-diameter portion and a large-diameter portion has the same function as the top surface of the edge portion 29.

Each of the rotor rib portions 27 may include an inclined surface. That is, a surface of each rotor rib portion 27 directed to the circumferential direction may be an inclined surface. Accordingly, outside air above the rotor portion 20 can be more easily guided into the motor 11 via the rotor hole portions 28 by rotation of the rotor portion 20. Accordingly, since the rotor rib portions 27 include an inclined surface, it is possible to efficiently cool the inside of the motor 11.

The vane portion 27a may include an inclined surface. That is, the surface of the vane portion 27a directed to the circumferential direction may be an inclined surface. Accordingly, a flow of air downward in the axial direction can be generated inside the motor 11 by rotation of the rotor portion 20, and the stator portion 30 can be more efficiently cooled. The vane portion 27a may not be provided in the corresponding rotor rib portion 27. The vane portion 27a may be provided separate from the rotor rib portion 27. In this case, for example, the circumferential position of the vane portion 27a may be different from the circumferential position of the rotor rib portion 27. The number of vane portions 27a and the number of rotor rib portions 27 may be different from each other.

A plurality of rotor rib portions 27 may be arranged at different intervals. For example, at least some rotor rib portions 27 among six rotor rib portions 27 may be arranged at different angles about the rotation axis J. When a plurality of rotor rib portions 27 are arranged at substantially equal intervals, noise and vibration may be caused due to resonance or the like. By changing the angles of the plurality of rotor rib portions 27, a natural vibration frequency changes and thus it is possible to reduce noise and vibration. When the vane portions 27a are provided separate from the rotor rib portions 27 as described above, either of the vane portions 27a or the rotor rib portions 27 may be arranged at different intervals and may be arranged at different angles about the rotation axis J.

Each base rib portion 43 may have an inclined rib shape that extends continuously from the base bottom portion 42 to the base ring portion 44. Since the base rib portion 43 has a straight or curved rib shape from the base bottom portion 42 to the base ring portion 44, penetration passages are formed in the axial direction and the radial direction. Accordingly, since air in the motor 11 can be discharged in the axial direction and the radial direction similarly to the rib shape including the horizontal rib portion 43a and the vertical rib portion 43b, it is possible to efficiently cool the inside of the motor 11.

The transmitter 4 may not include the CPU. In this case, various types of information are transmitted as analog signals to the receiver 6. The transmitter 4 may not include the memory. A destination of information transmitted from the wireless transmission unit of the transmitter 4 is not particularly limited. The information transmitted from the wireless transmission unit may be transmitted to a destination other than the flight controller 7 and the information analysis system 8.

The types of the sensors as the first detection units which are mounted in the motors 11 may be different. As the first detection unit, each motor 11 may be provided with three or more types of sensors or may be provided with a single type of sensors. The sensors as the first detection unit may be provided in the circuit board 61 or may be provided in a part of the motor 11 other than the circuit board 61. For example, when some of the first detection units are provided in the circuit board 61, some of the first detection units may be attached to the bottom surface of the circuit board 61. According to this configuration, it is possible to dispose the first detection units to be separated from the coils 32 emitting heat and to prevent the first detection units from being damaged due to the heat. The first detection units may not be provided in the motor 11. The first detection units may be provided in the main body section 1a or may be provided in a part of the propulsion unit 10 other than the motor 11. For example, by mounting the second temperature sensor in the main body section 1a, it is possible to easily detect the temperature of the atmosphere surrounding the motor 11 with high accuracy.

The above-mentioned types of sensors may be mounted as sensors for acquiring information other than the information of the motor 11 in the multicopter 1 separately from the first detection units. In this case, the sensor for acquiring information other than information of the motor 11 may be mounted in the motor 11 or may be mounted in a portion other than the motor 11. For example, the sensor for acquiring information other than the information of the motor 11 may be mounted in a portion other than the motor 11 in the propulsion unit 10 or may be mounted in the main body section 1a of the multicopter 1.

In the above-mentioned embodiment, the motor 11 is applied as a motor for the propulsion unit 10 of the multicopter 1, but the disclosure is not limited thereto. The motor is not particularly limited as long as it is a motor mounted in the main body section 1a or the propulsion unit 10. The motor may be, for example, a motor that changes the posture of the propulsion unit. In this case, the motor drives, for example, a portion in the main body section of the multicopter to which the propulsion unit is attached. Accordingly, it is possible to switch the posture of the propulsion unit when stability has a priority and the posture of the propulsion unit when a speed has a priority.

The above-mentioned configurations can be appropriately combined as long as they are mutually consistent.

The invention claimed is:

1. A multicopter that flies on the basis of information from a flight controller, the multicopter comprising:
   a main body section;
   a plurality of propulsion units that include a rotating rotary wing and are attached to the main body section;
   at least one motor that is mounted in the main body section or at least one of the plurality of propulsion units, wherein the at least one motor comprises a rotary section, the rotary section comprises a magnet and a rotor portion, the rotor portion comprises a rotor cylindrical portion, a plurality of rotor rib portions and rotor hole portions, the rotor cylindrical portion extends in an axial direction along an rotation axis, the plurality of rotor rib portions extend outward in a radial direction from the rotor cylindrical portion, and the rotor hole portions are disposed in a circumferential direction of the plurality of rotor rib portions;
   at least one first detection unit that comprises a first temperature sensor detecting temperature information of the at least one motor and a rotation sensor detecting circumferential position information of the rotary section;
   a stationary section that is attached to the main body section and includes a stator portion, a circuit board and a base portion, wherein the stator portion is located inside the rotor portion and includes a plurality of coils supplied with a current, wherein the circuit board includes a plurality of board protruding portions extending outward in the radial direction, wherein the rotation sensor is disposed in outer end portions in the radial direction on one of the plurality of board protruding portions, wherein the magnet of the rotary section passes through the rotation sensor and passes above the rotation sensor, wherein the first temperature sensor is disposed outside the plurality of coils and is disposed inside the rotation sensor in the radial direction, separately from the plurality of coils in the axial direction and faces teeth of the at least one motor, wherein the base portion includes a base cylindrical portion extending in the axial direction along the rotation axis, a base bottom portion spreading outward in the radial direction from the base cylindrical portion, and a plurality of base rib portions extending outward in the radial direction from the base bottom portion, wherein the base portion includes a plurality of base hole portions in a circumferential direction of the base rib portions, and each of the base hole portions is a hole penetrating the base portion in the axial direction; and a wireless transmission unit that wirelessly transmits the information of the at least one motor detected by the first detection unit to the outside.

2. The multicopter according to claim 1, further comprising a CPU that processes the information of the at least one motor detected by the first detection unit, wherein the CPU outputs the processed information of the at least one motor to the wireless transmission unit.

3. The multicopter according to claim 2, further comprising a memory that stores the information of the at least one motor processed by the CPU.

4. The multicopter according to claim 1, further comprising:

a battery that supplies a current to the plurality of propulsion units; and a current control unit that is electrically connected between the plurality of propulsion units and the battery and controls the current supplied from the battery to the plurality of propulsion units, wherein the current control unit outputs information of the current supplied from the battery to the current control unit to the wireless transmission unit, and wherein the wireless transmission unit wirelessly transmits the information of the current supplied from the battery to the current control unit to the outside.

5. The multicopter according to claim 1, further comprising a second detection unit that is mounted in the main body section, wherein the second detection unit detects information of a flying state of the multicopter, and wherein the wireless transmission unit wirelessly transmits the flying state of the multicopter detected by the second detection unit to the outside.

6. The multicopter according to claim 1, wherein the at least one motor is mounted in the at least one of the plurality of propulsion units and rotates the rotary wing.

7. The multicopter according to claim 6, wherein a plurality of the first detection units are provided for the at least one motor, and at least one of the first detection units further comprises at least one sensor detecting at least some information different from the temperature information.

8. The multicopter according to claim 7, wherein the at least one motor comprises a plurality of motors, each of the propulsion units includes one of the plurality of motors, and wherein the wireless transmission unit collects and transmits the information of the plurality of motors detected by the plurality of the first detection units for each of the propulsion units.

9. The multicopter according to claim 7, wherein the wireless transmission unit collects and transmits the information of the at least one motor detected by the plurality of first detection units for each of the first detection units.

10. The multicopter according to claim 1, wherein the wireless transmission unit transmits information to the flight controller.

11. The multicopter according to claim 1, wherein the wireless transmission unit transmits information to a cloud type information analysis system.

12. The multicopter according to claim 1, wherein the at least one motor includes the first detection unit.

* * * * *